(12) United States Patent   (10) Patent No.: US 9,079,499 B1
Raubvogel   (45) Date of Patent: Jul. 14, 2015

(54) AUTOMATIC ACTIVATION OF TURN SIGNALS IN A VEHICLE

(76) Inventor: Sara Elyse Raubvogel, Redwood City, CA (US)

(*) Notice: Subject to any disclaimer, the term of this patent is extended or adjusted under 35 U.S.C. 154(b) by 122 days.

(21) Appl. No.: 13/302,079

(22) Filed: Nov. 22, 2011

(51) Int. Cl.
*B60K 37/06* (2006.01)
*B60R 16/03* (2006.01)

(52) U.S. Cl.
CPC .............. *B60K 37/06* (2013.01); *B60R 16/0315* (2013.01)

(58) Field of Classification Search
CPC .... B60K 37/06; B60K 35/00; B60R 16/0315; B60R 16/0231; G01C 21/26
USPC .......................................................... 701/36
See application file for complete search history.

(56) References Cited

U.S. PATENT DOCUMENTS

| | | | | |
|---|---|---|---|---|
| 5,740,547 A | * | 4/1998 | Kull et al. | 701/19 |
| 5,742,925 A | * | 4/1998 | Baba | 701/469 |
| 5,905,433 A | * | 5/1999 | Wortham | 340/431 |
| 5,926,113 A | * | 7/1999 | Jones et al. | 340/906 |
| 5,986,575 A | * | 11/1999 | Jones et al. | 340/906 |
| 6,151,539 A | * | 11/2000 | Bergholz et al. | 701/25 |
| 6,975,218 B2 | * | 12/2005 | Madau | 340/476 |
| 7,843,360 B2 | * | 11/2010 | Ponziani | 340/901 |

* cited by examiner

*Primary Examiner* — James Trammell
*Assistant Examiner* — James E Stroud
(74) *Attorney, Agent, or Firm* — Raubvogel Law Office

(57) ABSTRACT

According to various embodiments, turn signals are automatically activated in response to signals received from a navigation system, based on the navigation instructions generated by the navigation system. The navigation system of a vehicle (either built into the vehicle or provided as a stand-alone unit) is communicatively coupled with or otherwise integrated with the turn signals of the vehicle. When the navigation system instructs the driver to perform a maneuver (such as making a turn), it can also cause the appropriate turn signal to be automatically activated at the appropriate time and/or distance in advance of the maneuver. When the navigation system detects that the maneuver has been made, or that the driver has ignored the system's instructions, the turn signal can be automatically deactivated.

27 Claims, 10 Drawing Sheets

AUTOMATIC ACTIVATION OF TURN SIGNALS IN A VEHICLE

FIELD OF THE INVENTION

The present invention relates to turn signals, or directional indicators, in vehicles, and more particularly to a system and method for automatically activating turn signals on a vehicle.

DESCRIPTION OF THE RELATED ART

In-car navigation systems employing Global Position System (GPS) technology are well known. Such systems provide drivers with a series of instructions and/or information to guide the driver to a specified destination. Typically, such instructions are provided via visual and/or auditory means. For example, once a driver has indicated a specified destination, a display screen may show a map of the route and/or a graphical depiction of an upcoming turn, entrance, exit, or intersection, while a spoken voice can provide instructions to the driver. Instructions can tell the driver to perform any suitable maneuver, such as for example, turns, freeway exits/entrances, lane changes, and the like.

Particular examples of instructions and information provided by navigation systems include, without limitation:

"In 500 feet, turn right"
"Stay in the right lane"
"In 1 mile, turn right onto El Camino Real"
"Your destination is ahead on the right"

Referring now to FIG. 1, there is shown an example of a screen 100 that may be used for outputting instructions according to the prior art. In the example, map 101 is shown, along with instructions 102 and an indication 103 of the distance and estimated time remaining in the trip. One skilled in the art will recognize that different navigation systems may offer such information and/or other information in many different formats.

The driver is free to follow or ignore the instructions as he or she sees fit. In many navigation systems, a new route to the destination is generated if the driver veers from the system's instructions.

Whether or not they are following a route specified by a navigation system, drivers often forget to activate their turn signals (directional indicators) when driving. This may occur because a driver is distracted, or careless, or sim-ply finds it too difficult or burdensome to use turn signals. Such failure to activate turn signals is a violation of traffic laws in most jurisdictions, and can lead to accidents because other drivers or pedestrians may not be aware of an intended action such as a turn or change of lanes.

SUMMARY

According to various embodiments of the present invention, turn signals are automatically activated in response to signals received from a navigation system, based on the navigation instructions generated by the navigation system. The navigation system of a vehicle (either built into the vehicle or provided as a stand-alone unit) is communicatively coupled with or otherwise integrated with the turn signal mechanism of the vehicle. When the navigation system instructs the driver to perform a maneuver (such as making a turn), it can also cause the appropriate turn signal to be automatically activated at the appropriate time and/or distance in advance of the maneuver. When the navigation system detects that the maneuver has been made, or that the driver has ignored the system's instructions, the turn signal can be automatically deactivated.

In one embodiment, the user can cancel the automatically activated turn signal after it has been activated. In another embodiment, the user can specify under what conditions the turn signal should be automatically activated based on instructions from the navigation system. For example, the user can, in one embodiment, specify the distance (before the intersection or other location) at which the turn signal should be automatically activated. In another embodiment, the interface of the navigation system can prompt the user as to whether the turn signal should be automatically activated. Such prompting can take place for each route instruction (i.e. as the route instruction is given), or for the entire session/drive, or it can be a setting that remains in effect until changed by the driver.

For example, if the navigation system instructs the driver to turn right at an upcoming intersection, it can cause the right-turn signal to be automatically activated at a specified distance in advance of the intersection. The signal can be canceled manually by the user. If the user makes the turn, the signal is canceled automatically. Additionally, if the user ignores the instructions, for example by proceeding straight through the intersection or making a left turn, in one embodiment the turn signal is also canceled automatically.

Further details and variations are described herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

According to various embodiments, the present invention can be implemented in a navigation system installed in a vehicle, or in a component that can be communicatively coupled with a navigation system. Such a navigation system can be a built-in system installed by the vehicle manufacturer, or it can be an after-market system. Alternatively, the invention can be implemented in a stand-alone or portable navigation system, handheld or mobile computing device, laptop computer, desktop computer, personal digital assistant (PDA), cellu-lar telephone, smartphone, music player, tablet computer, or the like, or any other device capable of generating routing instructions for a driver to follow. Such device may operate in a stand-alone fashion, using locally stored geographic data, or it can operate by connecting with a server containing geographic data; such communication can take place over the Internet, or over any suitable wireless data network, or any other suitable network. Alternatively, the techniques described herein can be implemented on any other type of computing device, combination of devices, or platform.

In some embodiments, the system of the present invention may be communicatively coupled to a turn signal control system or circuit of a vehicle, so as to be able to send signals to such a control system in order to automatically active turn signals. Such communication can take place over any suitable wired or wireless communications medium; for example, such communication can take place using a wireless communications protocol such as BlueTooth. In other embodiments, the system can be implemented using any other suitable mechanism for enabling a signal to be sent from a navigation system to a turn signal control system or circuit of a vehicle.

Although the invention is described herein in the context of automatically activating turn signals in a vehicle, one skilled in the art will recognize that the techniques of the present invention can be implemented in other contexts. Accordingly, the following description is intended to illustrate various embodiments of the invention by way of example, rather than to limit the scope of the claimed invention.

In one embodiment, the present invention is implemented as a feature of software that enables operation of a navigation system in a vehicle or on an electronic device. Such a feature may be part of the navigation system software itself, or it may be implemented as a plug-in or additional application or "app" that may be installed on the device that implements the navigation system software.

Figure 2:
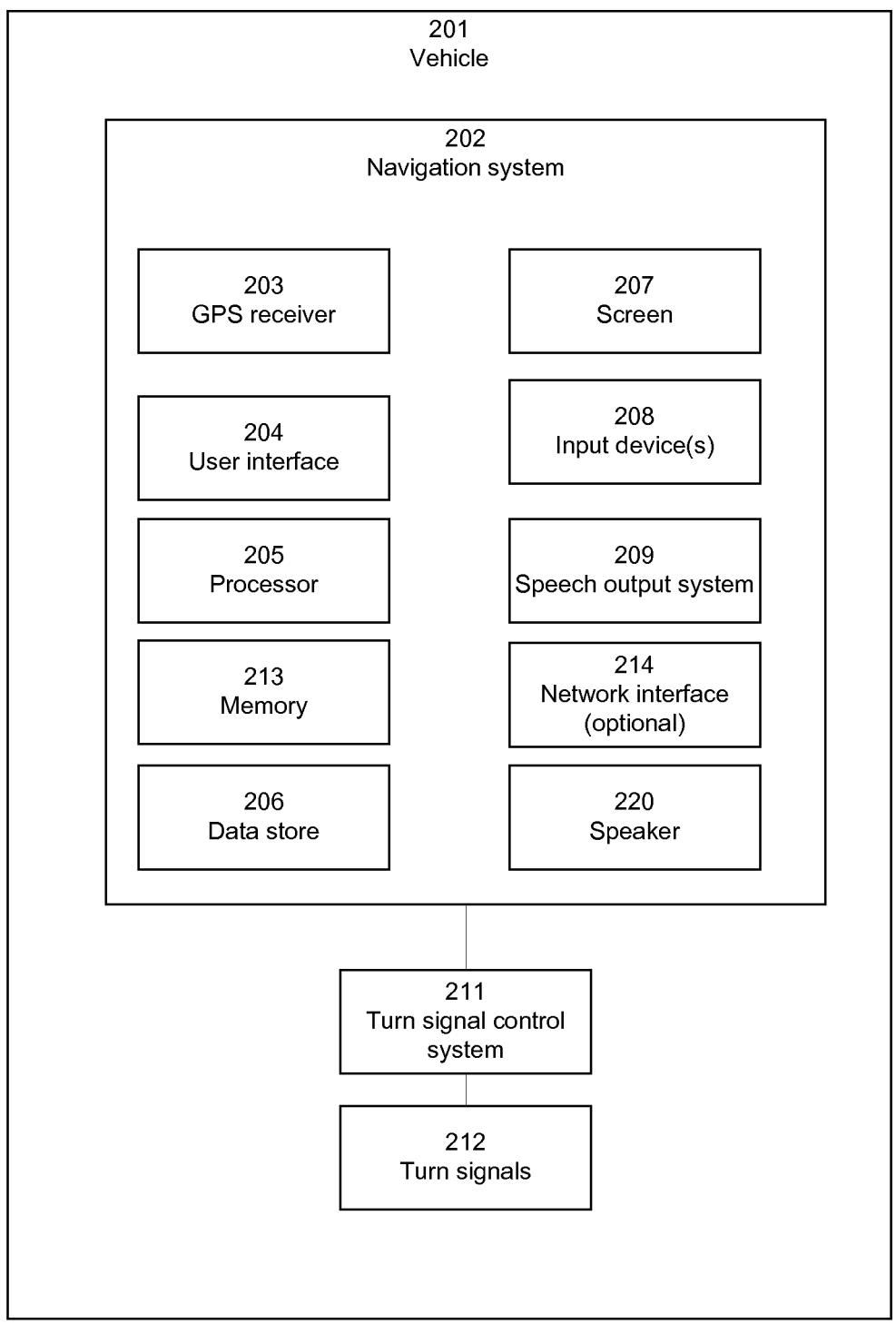
FIG. 2 is a block diagram depicting an architecture for practicing the present invention according to one embodiment of the present invention.

Referring now to FIG. 2, there is shown a block diagram depicting a hardware architecture for practicing the present invention according to one embodiment. Such an architecture can be used, for example, for implementing the techniques of the present invention in connection with a navigation system installed in vehicle 201. As discussed above, navigation system 202 may be a pre-installed component of vehicle 201, or one that is installed later, or it may be a stand-alone or portable unit. Navigation system 202 includes various components that are well known in the art. GPS receiver 203 receives signals from GPS satellites to determine the current location of vehicle 201. Data store 206 includes information such as road information, geographical information, points of interest, and the like. Data store 206 can be organized according to any suitable scheme, including for example as a relational database. Data store 206 can be embodied on any appropriate physical medium or media, including for example and without limitation, a hard drive, an optical drive, flash memory, random access memory, network-based or cloud-based media, and/or the like, and/or any combination thereof. Network interface 214 is an optional component that al-lows navigation system 202 to communicate with remotely located servers, via wired and/or wireless communication mechanisms, such as for example 3G. Navigation system 202 can thereby obtain street, traffic, and/or routing information from remote sources.

Figure 1:
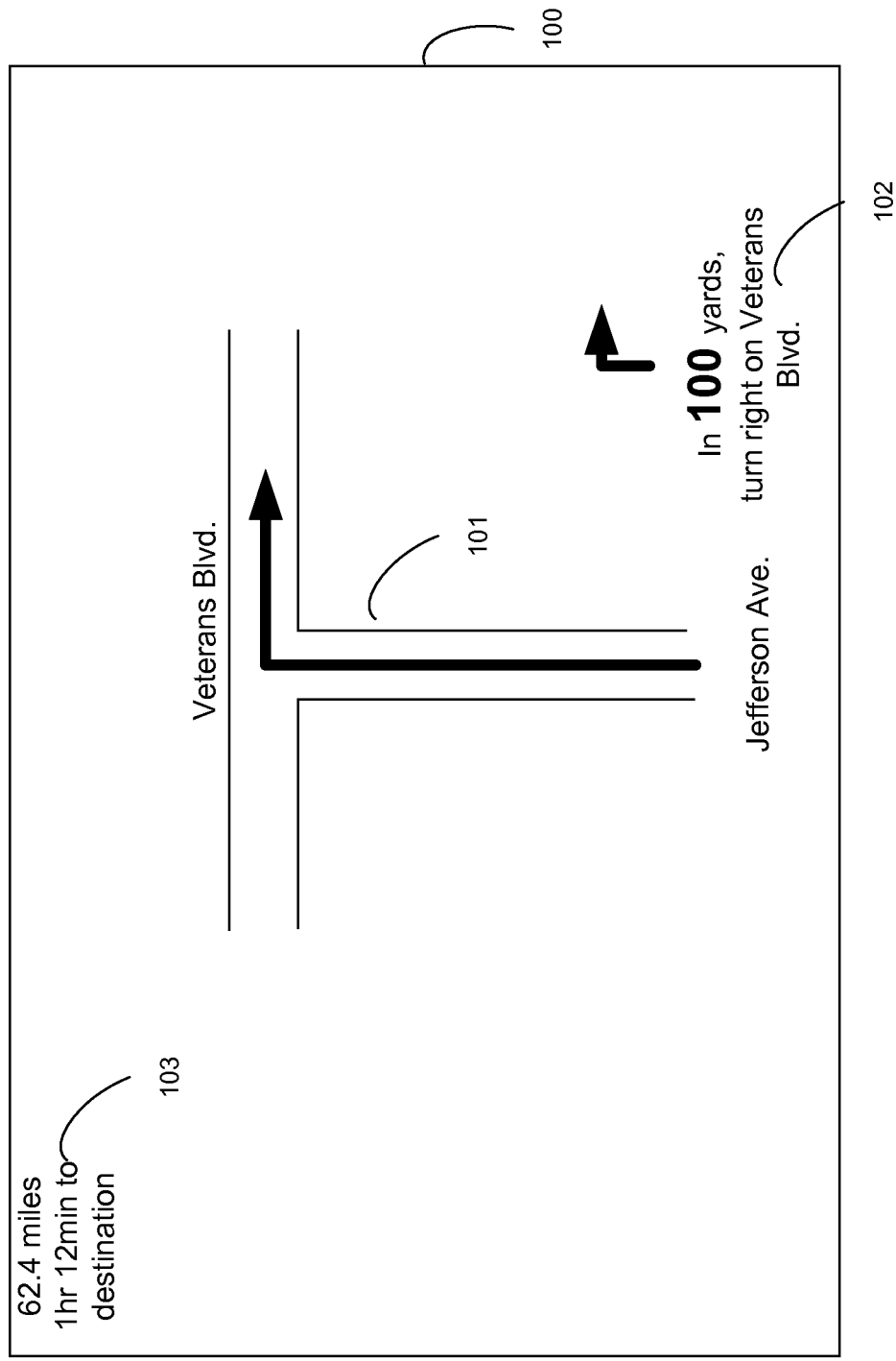
FIG. 1 depicts an example of a screen as may be displayed by a navigation system according to the prior art.

Processor 205 may be a microprocessor or any similar component for running software to implement the various features and functions of navigation system 202. In one embodiment, processor 205 runs software to implement these features and functions. In one embodiment, processor 205 uses location information from GPS receiver 203 together with road information from data store 206 (and/or information received from a remote server via network interface 214) to determine a suitable route for the driver to follow in order to reach a specified destination. Processor 205 determines the route using well known mechanisms, which may take into account distance, expected speed of various roads, road conditions, driver preferences (e.g. maximize or minimize freeways), road clo-sures, and/or the like. Once a route has been determined, processor 205 is able to generate screen output such as shown in the example of FIG. 1. Such output may be displayed on screen 207, which may be integrated into vehicle 201 or may be a separate component. Screen output may be accompanied by spoken instructions generated by speech output system 209 and output via speaker 220. Memory 213 can be random-access memory having a structure and architecture as are known in the art, for use by processor 205 in the course of running software.

Navigation system 202 may also include any suitable form of input device(s) 208, which may include, for example and without limitation, a touch-screen, knob, switches, buttons, keyboard, pointing device, five-way switch, joy-stick, dial, steering-wheel mounted controls, speech recognition system (with microphone for receiving spoken audio from the driver), touchpad, and/or the like. Any number of such input device(s) 208 can be provided, either singly or in any combination. If input device 208 includes a speech recognition system, such a system can use any suitable speech-to-text system or technology as may be known in the art. In one embodiment, input device(s) 208 can be used by the driver to specify a desired destination, respond to prompts, and issue various commands relevant to the operation of navigation system 202.

In one embodiment, a user interface 204 is implemented, for example in software running on processor 205. User interface 204 presents output to the driver via screen 207, including for example a display of a route to the specified destination, on-screen prompts and options, and the like. User interface 204 is also configured to accept input from the driver according to an appropriate input mode for input device(s) 208, including specification of destination, responses to prompts, and the like.

As mentioned above, in one embodiment, under the direction of user interface 204, system 202 may also provide audio output, including for example spoken output, alert sounds, and/or the like. Speech output system 209 may be configured to generate spoken output to instruct the user according to the specified route. Speech output system 209 can use any known text-to-speech system and/or technology for generating spoken output. As is known in the art, such spoken output may include instructions to make certain turns, lane changes, exits and entrances, and the like. Speech output system 209 sends such spoken input to speaker 220 for output to the driver.

Speaker 220 may be installed in vehicle 201 or may be a component of a stand-alone navigation system 202. Alternatively, speaker 220 may also be a component of a headset (not shown) worn by driver.

Turn signal control system 211 can be any suitable control system for activating turn signals 212. More particularly, turn signal control system 211 can be any suitable mechanism for transmitting electrical signals to cause turn signals 212 to operate. For example, turn signal control system 211 can include a thermal flasher or any suitable electronic equivalent; such system 211 can include circuitry for causing turn signals 212 to blink in an intermittent fashion. Turn signals 212 themselves can be any visual and/or auditory indicator(s), including for example incandescent, fluorescent, or other type of light bulb(s), light emit-ting diode(s) (LED(s)), speaker(s), and the like. In one embodiment, multiple turn signals 212 are available, for example to indicate right turns and left turns. In one embodiment, turn signals 212 are located in various locations on vehicle 201, including for example the front, rear, and/or sides of vehicle 201.

In one embodiment, navigation system 202 is communicatively coupled, either directly or indirectly, with turn signal control system 211 of vehicle, so as to enable navigation system 202 to send signals to turn signal control system 211 to activate turn signals 212 of vehicle 201 automatically based on route instructions generated or received by navigation system 202. Thus, in one embodiment, if vehicle 201 is approaching a location where the determined route indicates that a maneuver such as a right turn or right exit should be performed, the system of the present invention sends a signal to turn signal control system 211 to cause right-hand turn signal(s) 212 to be automatically activated. Conversely, in one embodiment, if vehicle 201 is approaching a location where the determined route indicates that a maneuver such as a left turn or left exit should be performed, the system of the present invention sends a signal to turn signal control system 211 to cause left-hand turn signal(s) 212 to be automatically activated.

Communication between navigation system 202 and turn signal control system 211 can be accomplished using any suitable wired or wireless signal transmission means. One example, without limitation, is the BlueTooth protocol, although any other personal area network for wireless signal transmission can be used. Alternatively, navigation system 202 can transmit signals to turn signal control system 211 via a wired transmission path for digital signals. As described in more detail below, navigation system 202 can, in one embodiment, transmit a signal to cause turn signal control system 211 to automatically activate turn signals 212 when vehicle 201 is approaching an intersection, entrance/exit ramp, or other location where the determined route indicates that a maneuver (such as a turn, entrance, exit, or lane change) should be performed. Under the expectation that the driver will perform the specified maneuver, the system of the present invention thus provides a mechanism by which turn signals 212 can be automatically activated.

One skilled in the art will recognize that the particular arrangement of hardware elements shown in FIG. 2 is merely exemplary, and that the invention can be implemented using different hardware elements configured in any of a number of different ways. Thus, the particular architecture shown in FIG. 2 is merely illustrative and is not intended to limit the scope of the invention in any way. In particular, in one embodiment, the system of the present invention can communicate with one or more server(s) via any suitable communications network such as the Internet, and that any of the components depicted in FIG. 2 can be implemented as a server-based component according to well known techniques.

Method of Operation

In one embodiment, the system automatically activates the appropriate turn signal 212 at a specified distance before a maneuver location as specified by the route instructions. In another embodiment, the system of the present invention gives the driver an opportunity to cancel an automatically activated turn signal 212. In yet another embodiment, the system of the present invention gives the driver an opportunity to manually activate turn signal 212; however, if the driver forgets to do so, the system automatically activates the appropriate turn signal 212. In yet another embodiment, the system prompts the driver to indicate whether or not turn signal 212 should be activated; if the driver indicates an af-firmative response, by whatever input mechanism is appropriate, the system automatically activates turn signal 212. In yet another embodiment, the system prompts the driver to remind him or her to activate the appropriate turn signal 212, but does not activate turn signal 212 automatically.

These various embodiments will be described with reference to FIGS. 3 through 7.

Figure 3:
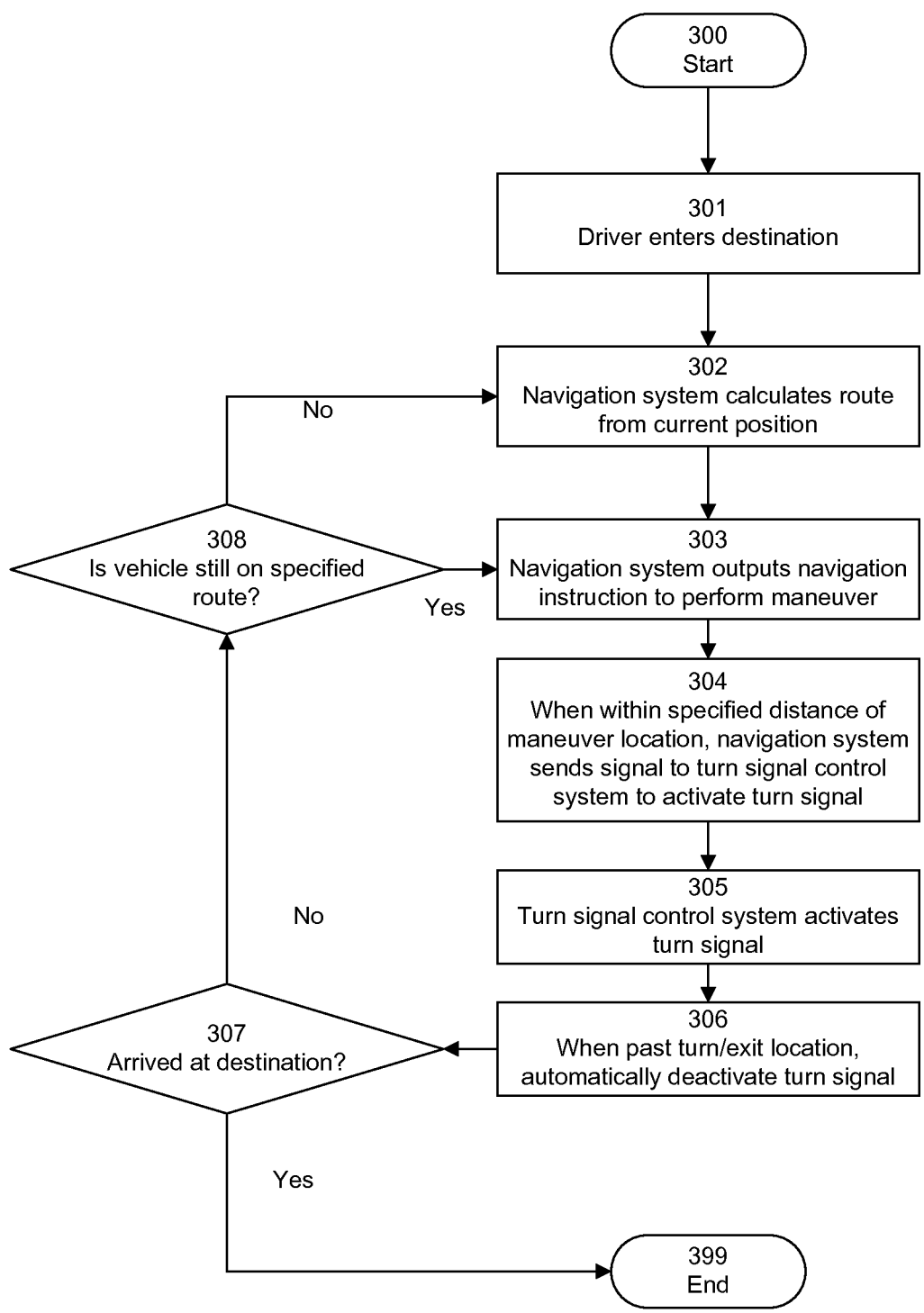
FIG. 3 is a flow diagram depicting a method for practicing the present invention according to one embodiment, wherein turn signals are automatically activated based on navigation instructions.

FIG. 3 is a flow diagram depicting a method for practicing the present invention according to one embodiment of the present invention, wherein turn signals 212 are automatically activated responsive to navigation instructions from navigation system 202.

The driver enters 301 a destination into navigation system 202, using any suitable input device(s) 208. Destination can be entered using knobs, dials, buttons, touch-screen, voice input, and/or any combination thereof.

Navigation system 202 calculates 302 a route to the specified destination, based on vehicle's 201 current position as determined by GPS receiver 203, and further based on road information and/or other information stored in data store 206 and/or obtained from a server. Such route calculation can be performed using any suitable techniques as are known for use in navigation systems.

As vehicle 201 travels along the route, navigation system 202 outputs 303 any number of navigation instructions for the driver to follow. Each navigation instruction specifies a maneuver such as a turn, exit, entrance, lane change, the like. The system of the present invention can output 303 instructions using any technique and/or methodology that may be known for such output 303 in a navigation system. Such instructions can be output 303, for example, as a series of spoken instructions via speech output system 209, and/or instructions displayed on screen 207. In one embodiment, each successive instruction is output 303 as vehicle 201 approaches the intersection, entrance/exit ramp, or other geographical location where the instruction is to be followed. In other embodiments, any number of instructions can be output 303 simultaneously or in advance of reaching the intersection(s), entrance/exit ramp(s), or other geographical location(s) where the instructions are to be followed. Instructions can be present in textual, graphical, spoken, and/or other form. As is known in the art, instructions can be accompanied by a map or other display, which may change continually to reflect vehicle's 201 current position.

In one embodiment, when vehicle 201 is within a specified distance of an intersection, entrance/exit ramp, or other geographical location where an instruction is to be followed, navigation system 202 sends 304 a signal to turn signal control system 211 of vehicle 201 to cause system 211 to automatically activate appropriate turn signal(s) 212 reflecting the maneuver specified by the instruction. For example, if the specified maneuver is a right turn or right exit, navigation system 202 may cause turn signal control system 211 to activate right turn signal(s) 212. Conversely, if the maneuver is a left turn or left exit, navigation system 202 may cause turn signal control system 211 to activate left turn signal(s) 212.

Turn signal control system 211 automatically activates 305 specified turn signal(s) 212 according to the signal received from navigation system 202. Optionally, navigation system 202 can notify the driver that turn signal(s) 212 have been automatically activated, either via visual or auditory means, or both.

In this manner, turn signal(s) 212 is/are automatically activated based on instructions generated by navigation system 202.

In one embodiment, once vehicle 201 is past the geographical location where the instruction was to be followed, turn signal control system 211 automatically deactivates 306 turn signal(s) 212. If the driver caused vehicle 201 to make a turn, such deactivation 306 can take place using known mechanical and/or electrical means for deactivating a turn signal after a turn is made. If, however, the driver ignored the instruction, and/or if the instruction specified a maneuver that was insufficient to deactivate turn signal(s) 212 by conventional means, navigation system 202 can detect that vehicle 201 has passed the geographic location where the instruction was to be followed. In such a situation, in one embodiment, navigation system 202 sends a signal to cause turn signal control system 211 to automatically deactivate 306 turn signal(s) 212.

If vehicle 201 has arrived 307 at the specified destination, the method ends 399. Otherwise, in one embodiment, if the driver ignores the instruction, or if vehicle 201 goes off the specified route for any other reason, the method can return to step 302 to recalculate the route. Accordingly, in one embodiment, step 308 determines whether vehicle 201 is still on the specified route. If so, the method returns to step 303; otherwise the method returns to step 302 to recalculate the route based on the current position of vehicle 201. Steps 303 through 306 are then repeated.

Figure 4:
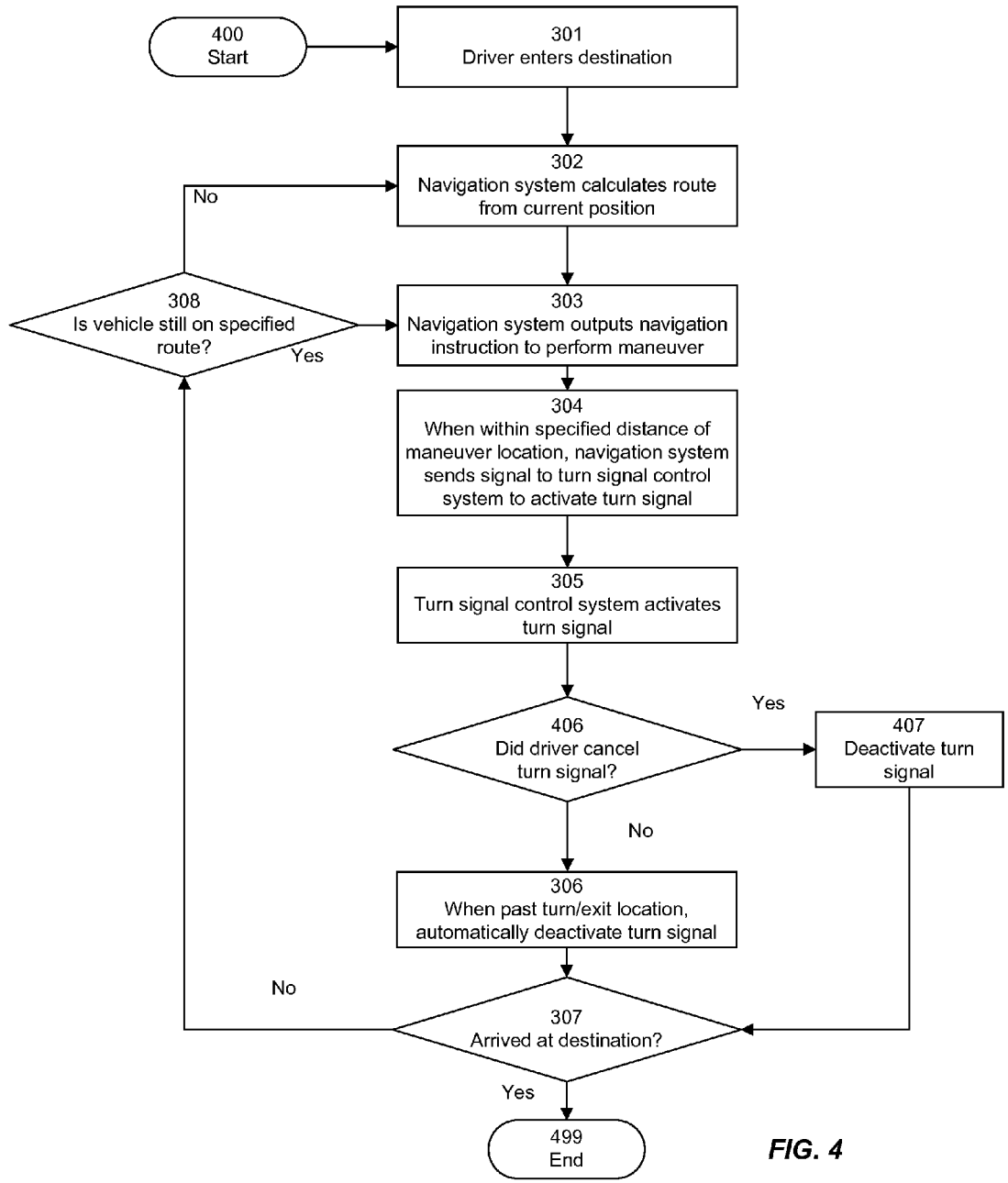
FIG. 4 is a flow diagram depicting a method for practicing the present invention according to one embodiment, wherein the driver can optionally cancel the automatic turn signal.

Referring now to FIG. 4, there is shown a flow diagram depicting a method for practicing the present invention according to one embodiment of the present invention, wherein the driver can optionally cancel the automatic turn signal. Steps 301 through 305 are performed as described in connection with FIG. 3. However, once turn signal control system 211 has automatically activated 305 specified turn signal(s) 212 according to the signal received from navigation system 202, the driver is able to cancel turn signal(s) 212, either by manipulating turn signal controls in a conventional manner, or by providing a command or other input to navigation system 202. If the driver cancels 406 turn signal(s) 212, turn signal control system 211 deactivates 407 turn signal(s) 212. In one embodiment, if the driver cancels 406 turn signal(s) 212 via navigation system 202, deactivation 407 can take place responsive to a signal sent from navigation system 202 to turn signal control system 211.

Steps 306 through 308 are performed as described in connection with FIG. 3. If, in step 307, vehicle 201 has arrived at the destination, the method ends 499.

Figure 5:
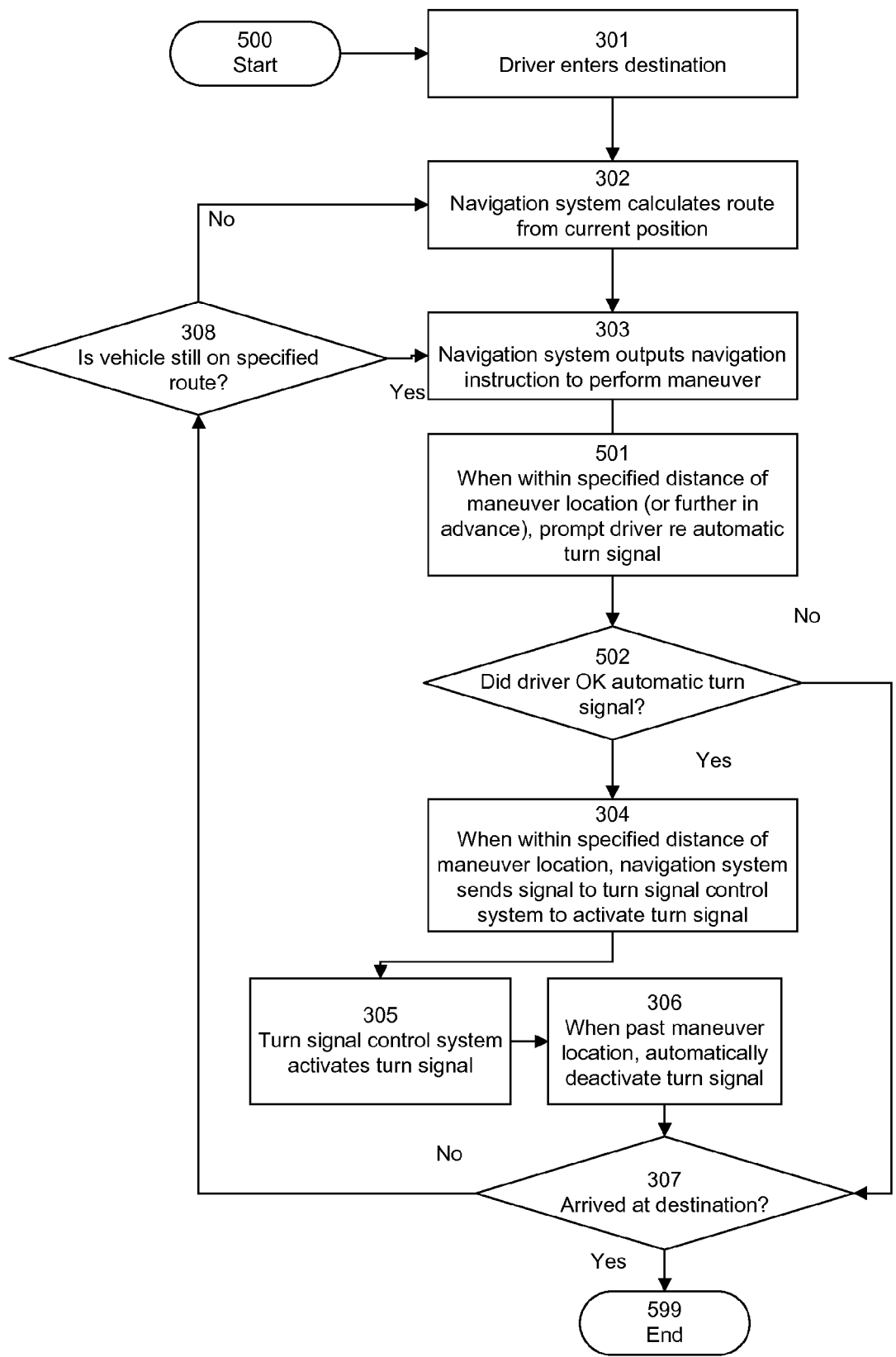
FIG. 5 is a flow diagram depicting a method for practicing the present invention according to one embodiment, wherein the system prompts the driver as to whether a turn signal should be automatically activated.

Referring now to FIG. 5, there is shown a flow diagram depicting a method for practicing the present invention according to one embodiment of the present invention, wherein the system prompts the driver as to whether turn signal(s) 212 should be automatically activated. Steps 301 through 303 are performed as described in connection with FIG. 3. Navigation system 202 or some other component prompts 501 the driver to indicate whether turn signal(s) 212 should be automatically activated. In one embodiment, such prompting is performed when vehicle 201 is within a specified distance of a location for performing a maneuver as specified by an instruction generated by navigation system 202. In another embodiment, such prompting can take place further in advance, for example upon initial output of the navigation instruction. In yet another embodiment, such prompting can take place at the time the driver enters 301 the destination, or at the time the route is initially calculated 302. The driver's indication as to whether or not turn signal(s) 212 should be automatically activated can be effective for a single navigation instruction, or for an entire route, or it can be a global setting that remains in effect until the driver changes it.

Prompting 501 of the driver can take place by any suitable output mechanism, whether visual and/or auditory; examples include screen 207 and/or speech output system 209, and/or a beep or other sound. The driver can respond via any suitable input device 208, such as via a physical or virtual control or button, or voice control. In one embodiment, the system of the present invention can acknowledge the driver's response via any suitable output mechanism.

If the driver indicated that turn signal(s) 212 should be automatically activated 502, steps 304 through 307 are performed as described in connection with FIG. 3. If the driver indicated that turn signal(s) 212 should not be automatically activated 502, the method proceeds directly to step 307 to determine whether or not vehicle 201 has arrived 307 at the specified destination.

If vehicle 201 has arrived 307 at the specified destination, the method ends 599.

Otherwise, in one embodiment, if the driver ignores the instruction, or if vehicle 201 goes off the specified route for any other reason, the method can return to step 302 to recalculate the route. Accordingly, in one embodiment, step 308 determines whether vehicle 201 is still on the specified route. If so, the method returns to step 303; otherwise the method returns to step 302 to recalculate the route based on the current position of vehicle 201. Steps 303 through 306 are then repeated.

Figure 6:
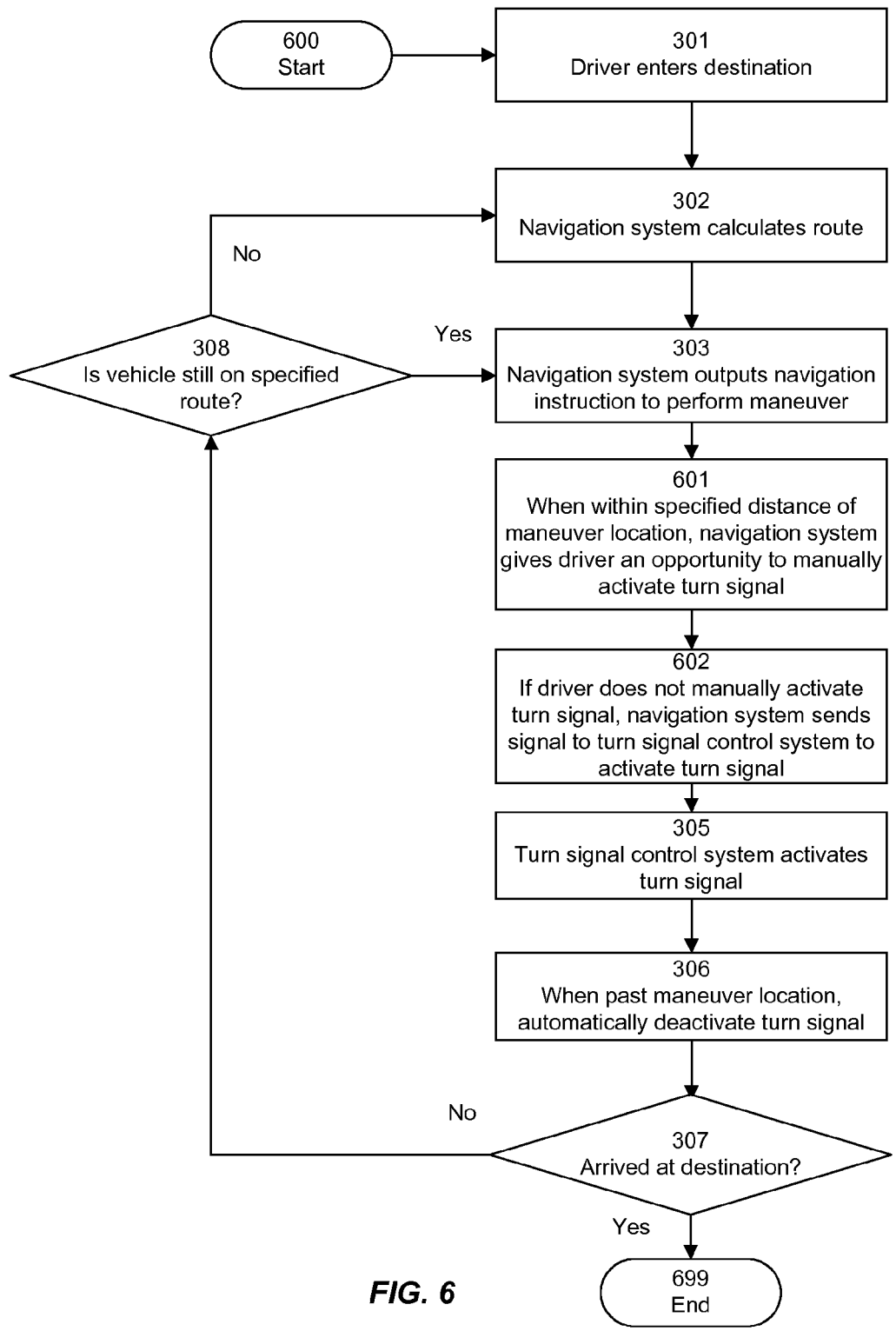
FIG. 6 is a flow diagram depicting a method for practicing the present invention according to one embodiment, wherein the system gives the driver an opportunity to manually activate a turn signal before automatically activating the turn signal.

Referring now to FIG. 6, there is shown a flow diagram depicting a method for practicing the present invention according to another embodiment of the present invention, wherein the system gives the driver an opportunity to manually activate turn signal(s) 212 before they are automatically activated.

Steps 301 through 303 are performed as described in connection with FIG. 3. In one embodiment, when vehicle 201 is within a specified distance of an intersection, entrance/exit ramp, or other geographical location where an instruction is to be followed, navigation system 202 gives 601 the driver an opportunity to manually activate turn signal(s) 212. For example, navigation system 202 may wait some specified period of time, such as five to ten seconds, to allow the driver to manually activate turn signal(s) 212. The period of time may de-pend on vehicle 201 velocity, and/or it may reflect a specified traveled distance, or it may be a fixed or predetermined period of time. In one embodiment, such period of time can be configured by the driver or by some other individual.

If the driver does not manually activate turn signal(s) 212 within the period of time, navigation system 202 sends 602 a signal to turn signal control system 211 of vehicle 201 to cause system 211 to automatically activate appropriate turn signal(s) 212 reflecting the instruction. For example, if the maneuver specified by the instruction is a right turn or right exit, navigation system 202 may cause turn signal control system 211 to activate right turn signal(s) 212. Conversely, if the maneuver specified by the instruction is a left turn or left exit, navigation system 202 may cause turn signal control system 211 to activate left turn signal(s) 212. Optionally, output screen 207 of navigation system 202 can notify the driver that turn signal(s) 212 have been automatically activated.

Steps 305 through 308 are performed as described in connection with FIG. 3. If, in step 307, vehicle 201 has arrived at the destination, the method ends 699.

Figure 7:
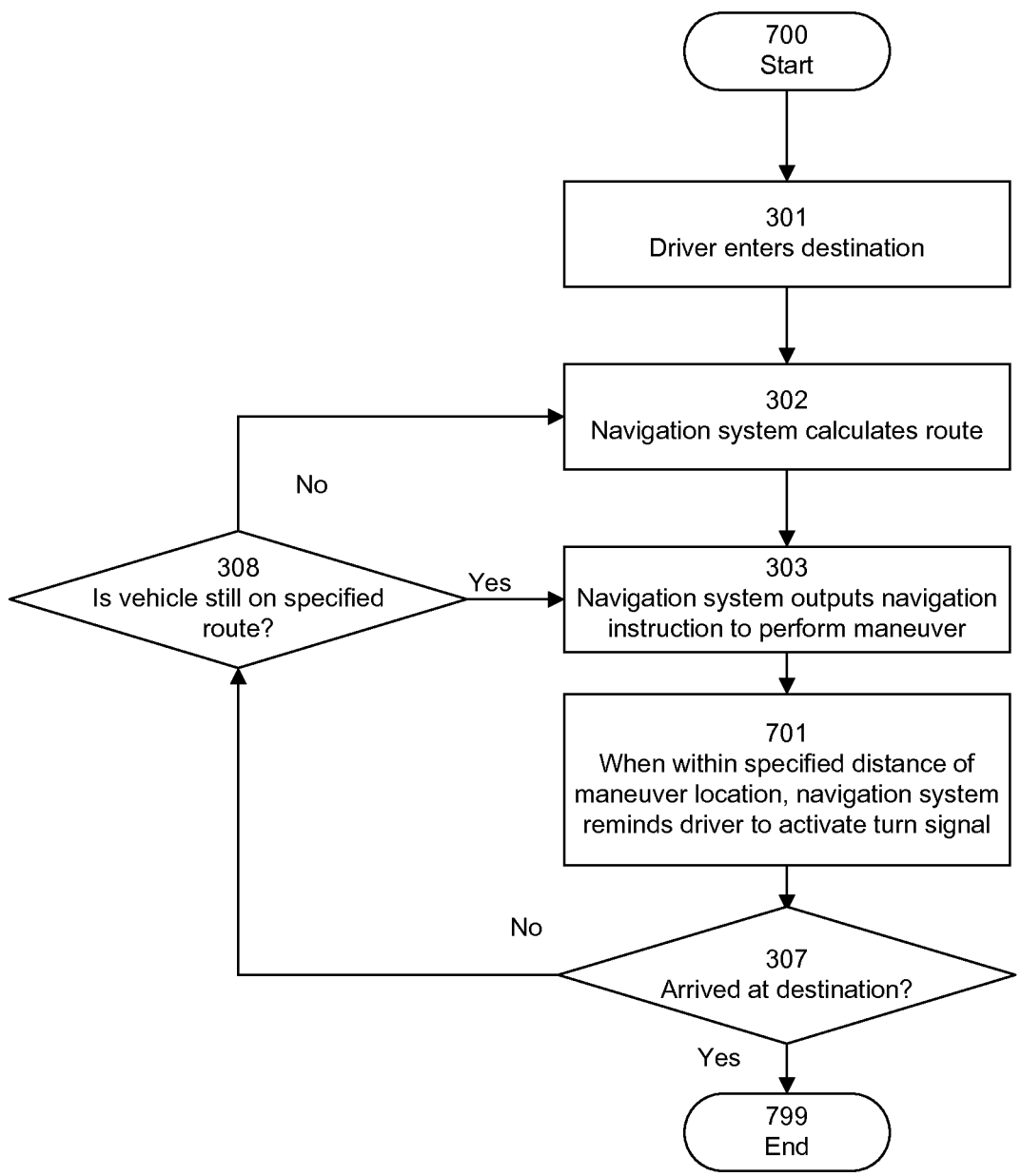
FIG. 7 is a flow diagram depicting a method for practicing the present invention according to one embodiment, wherein the system reminds the driver to activate the turn signal.

Referring now to FIG. 7, there is shown a flow diagram depicting a method for practicing the present invention according to one embodiment of the present invention, wherein the system reminds the driver to activate turn signal(s) 212.

Steps 301 through 303 are performed as described in connection with FIG. 3. In one embodiment, when vehicle 201 is within a specified distance of an intersection, entrance/exit ramp, or other geographical location where an instruction is to be followed, navigation system 202 outputs 701 a reminder to the driver to activate turn signal(s) 212. Such reminder can be presented to the driver via any suitable output mechanism, whether visual and/or auditory; examples include screen 207 and/or speech output system 209, and/or a beep or other sound. For example, speech output system 209 can say, "You are approaching the intersection. Don't forget to signal left.", or some other suitable spoken reminder. Alternatively, or in addition to the spoken output, a similar message can appear on screen 207, and/or a distinctive auditory alert such as a beep may be sounded. In one embodiment, such reminder is provided in addition to automatic turn signal 212 activation as described above. In another embodiment, the system of the present invention merely provides reminders but does not automatically activate turn signal(s) 212.

Steps 307 and 308 are performed as described in connection with FIG. 3. If, in step 307, vehicle 201 has arrived at the destination, the method ends 799.

Example

Figure 8A:
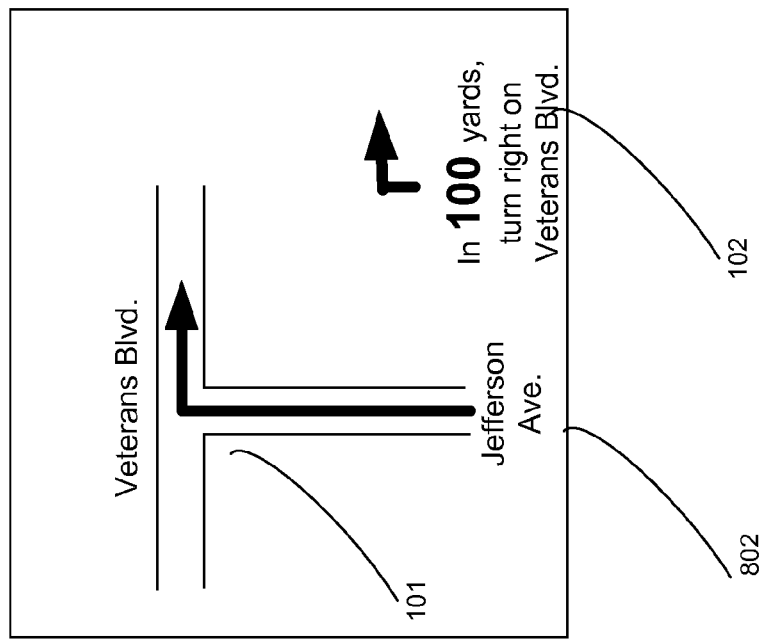
FIGS. 8A through 8C depict an example of the operation of the present invention according to one embodiment.
Figure 8A:
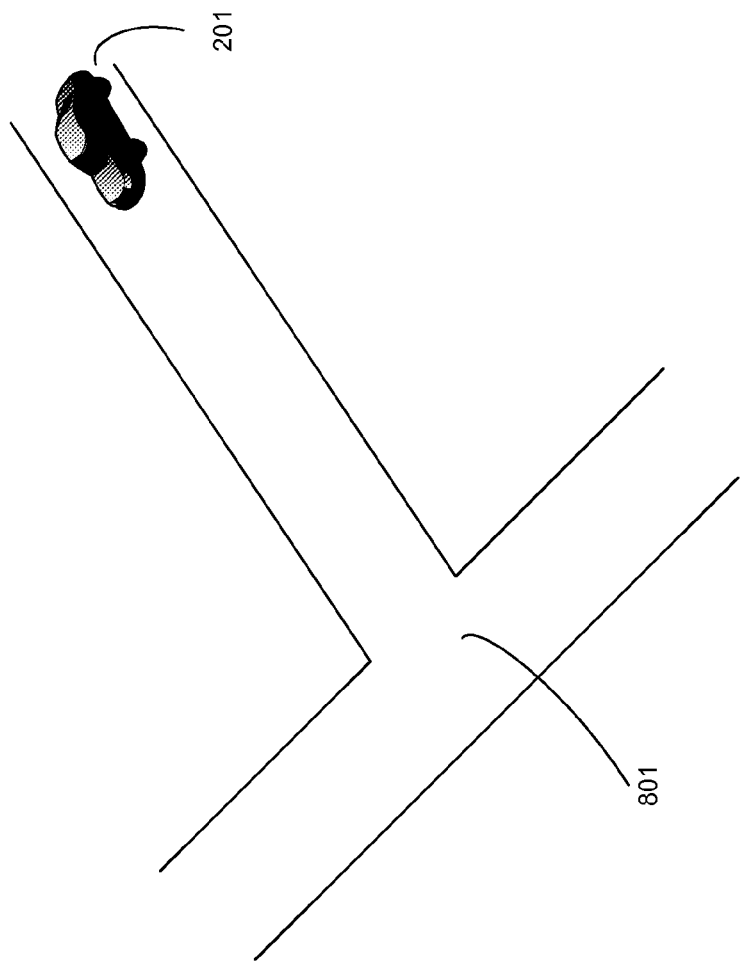
Figure 8B:
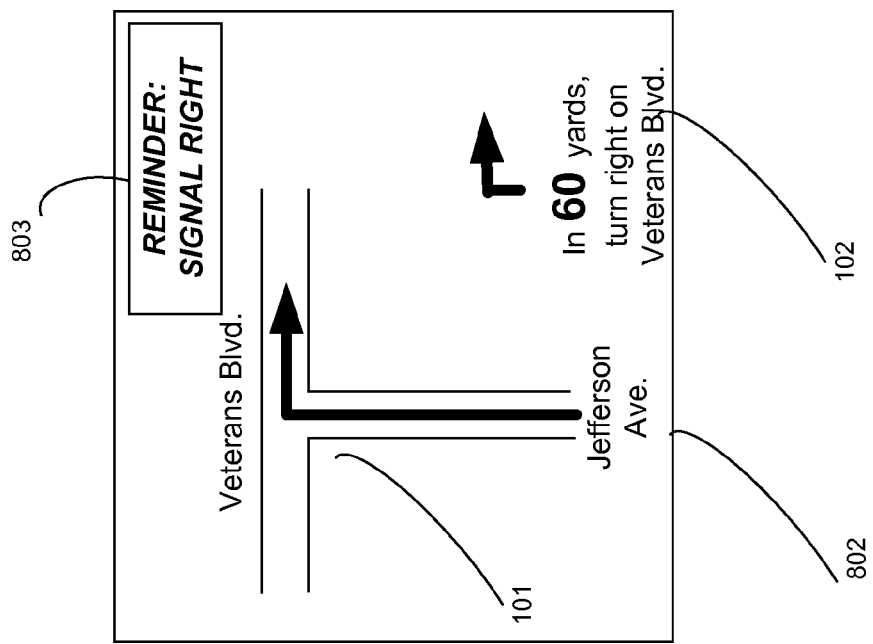
Figure 8B:
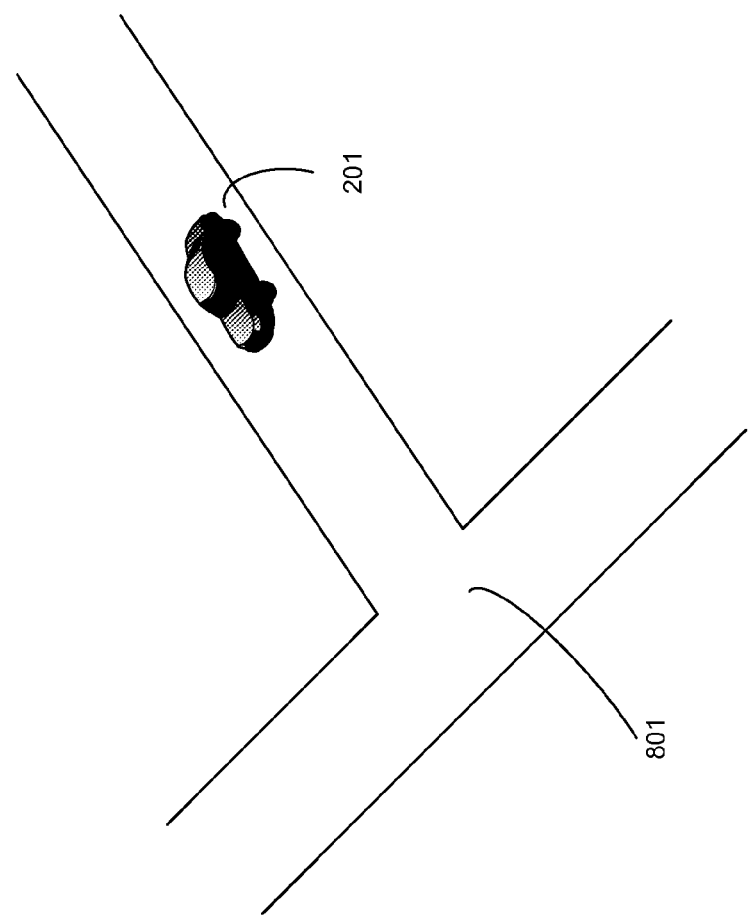
Figure 8C:
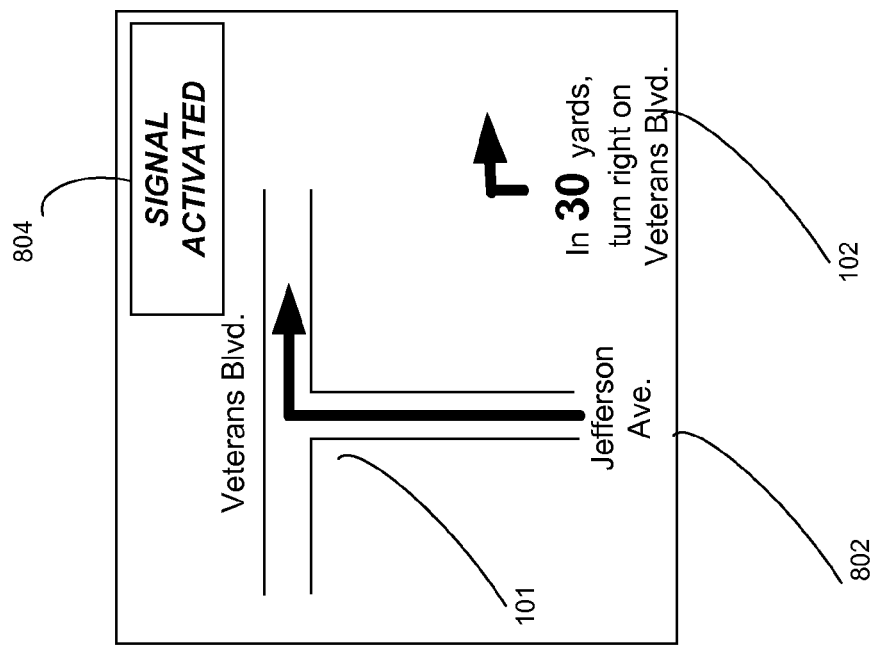
Figure 8C:
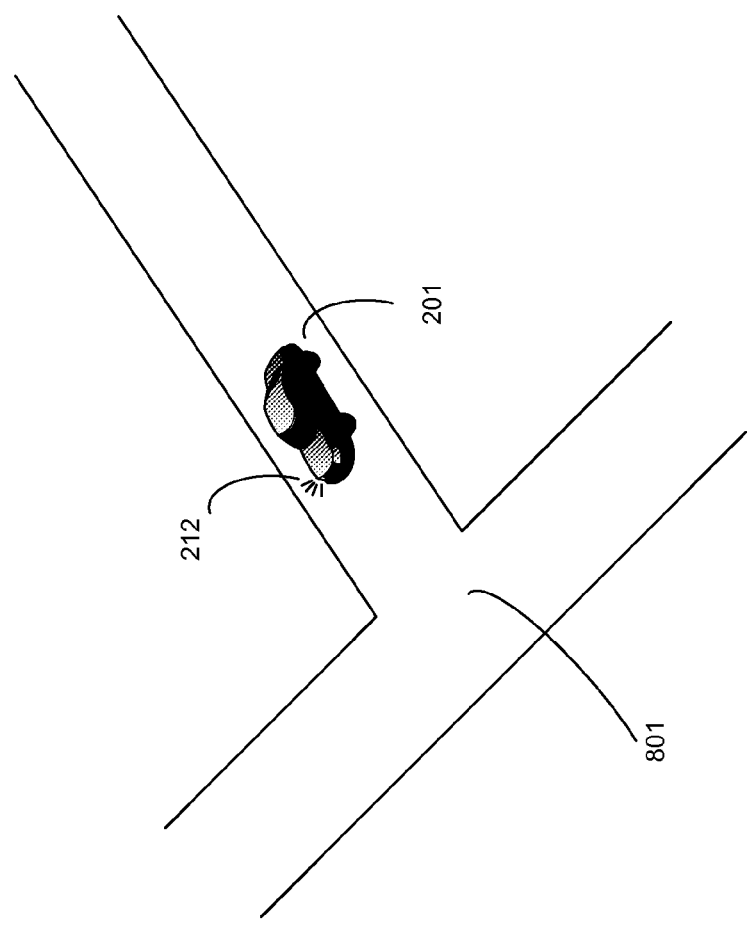

Referring now to FIGS. 8A through 8C, there is shown an example of the operation of the present invention according to one embodiment.

In FIG. 8A, vehicle 201 is 100 yards from intersection 801 where a right turn is to be performed, according to the determined route. Also shown in FIG. 8A is an example of screen 802 as it might appear when vehicle 201 is 100 yards from intersection 801. Map 802 is presented, along instruction 102 to turn right. As is known in the art, navigation system 202 may also output auditory instructions via speaker 220. One skilled in the art will recognize that the depicted scenario is merely exemplary; for example, instruction 201 may be presented at any suitable distance from intersection 801.

As described above, in some embodiments, the driver is reminded to manually activate turn signal 212 before automatic activation takes place. In FIG. 8B, vehicle 201 is 60 yards from intersection 801. Screen 802 now includes reminder 803 prompting the driver to activate right turn signal 212. In one embodiment, spoken output can be provided instead of or in addition to visual reminder 803, to prompt the driver to activate right turn signal 212. One skilled in the art will recognize that the depicted scenario is merely exemplary; for example, reminder 803 may be presented at any suitable distance from intersection 801. Alternatively, in some embodiments, reminder 803 is not displayed.

As described above, in some embodiments, turn signal 212 is automatically activated at a certain distance from the location where the specified maneuver (in this case a right turn) is to be performed. In FIG. 8C, vehicle 201 is 30 yards from intersection 801. Accordingly, navigation system 202 has sent a signal causing turn signal 212 to be automatically activated. In one embodiment, screen 802 includes a notification 804 informing the driver that turn signal 212 has been automatically activated. In one embodiment, spoken output can be provided instead of or in addition to visual notification 804, to inform the driver that turn signal 212 has been automatically activated. Again, one skilled in the art will recognize that the depicted scenario is merely exemplary; for example, turn signal 212 may be automatically activated at any suitable distance from intersection 801. Alternatively, in some embodiments, turn signal 212 may not be automatically activated. Alternatively, in some embodiments, turn signal 212 may be automatically activated, but notification 804 may be omitted or presented in some other form than that depicted in FIG. 8C (for example, an auditory notification can be presented).

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of func-tionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a nontransitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated cir-cuits (ASICs), or any type of nontransitory media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more special-ized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joy-stick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not de-part from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for automatically activating a turn signal in a vehicle operated by a human driver, comprising:
    in a navigation device operating in the vehicle operated by the human driver, receiving a destination;
    in the navigation device, determining a current location of the vehicle;
    in the navigation device, determining a route to the destination based on the current location of the vehicle;
    in the navigation device, generating an instruction for following the determined route, the instruction specifying a maneuver to be performed by the human driver at a specified location;
    on an output device, and in advance of the vehicle reaching the specified location, outputting the generated instruction to the human driver;
    subsequent to outputting the generated instruction, and in advance of the specified maneuver being performed by the human driver, determining whether the human driver has manually activated the turn signal to indicate the specified maneuver; and
    in advance of the vehicle reaching the specified location, and in advance of the specified maneuver being performed by the human driver, and in response to a determination that the human driver of the vehicle has not manually activated the turn signal to indicate the specified maneuver, automatically sending a signal from the navigation device to a turn signal controller to cause the turn signal of the vehicle to be automatically activated, wherein the automatically activated turn signal indicates the maneuver specified by the instruction output to the human driver.

2. The method of claim 1, further comprising, subsequent to automatically sending a signal from the navigation device to the turn signal controller to cause the turn signal of the vehicle to be automatically activated, and responsive to human driver input to cancel the turn signal, sending a signal to the turn signal controller to cause the turn signal to be deactivated.

3. A method for automatically reminding a human driver to manually activate a turn signal in a vehicle operated by the human driver, comprising:

in a navigation device operating in the vehicle operated by the human driver, receiving a destination;

in the navigation device, determining a current location of the vehicle;

in the navigation device, determining a route to the destination based on the current location of the vehicle;

in the navigation device, generating an instruction for following the determined route, the instruction specifying a maneuver to be performed by the human driver at a specified location;

on an output device, in advance of the vehicle reaching the specified location, outputting the generated instruction to the human driver;

subsequent to outputting the generated instruction, and in advance of the specified maneuver being performed by the human driver, determining whether the human driver has manually activated the turn signal to indicate the specified maneuver; and on the output device, in advance of the vehicle reaching the specified location, and in advance of the specified maneuver being performed by the human driver, and in response to a determination that the human driver of the vehicle has not manually activated the turn signal to indicate the specified maneuver, automatically outputting a reminder to the human driver to manually activate the turn signal.

4. The method of claim 3, further comprising, in response to a determination that the human driver has not manually activated the turn signal after the reminder has been output, automatically sending a signal from the navigation device to a turn signal controller to cause the turn signal of the vehicle to be automatically activated, wherein the automatically activated turn signal indicates the maneuver specified by the instruction output to the human driver.

5. A system for automatically activating a turn signal in a vehicle operated by a human driver, comprising:

an input device, configured to receive input specifying a destination for the vehicle operated by the human driver;

a geographical position determination device, configured to determine a current location of the vehicle;

a processor, communicatively coupled to the input device and to the geographical position determination device, configured to:
determine a route to the destination based on the current location of the vehicle; and
generate an instruction for following the determined route, the instruction specifying a maneuver to be performed by the human driver at a specified location;

an output device, communicatively coupled to the processor, configured to output the generated instruction to the human driver in advance of the vehicle reaching the specified location; and a signal transmission device, communicatively coupled to the processor, configured to, in advance of the vehicle reaching the specified location, and in advance of the specified maneuver being performed by the human driver, and in response to a determination that the human driver of the vehicle has not manually activated the turn signal to indicate the specified maneuver, automatically send a signal to a turn signal controller to cause the turn signal of the vehicle to be automatically activated, wherein the automatically activated turn signal indicates the maneuver specified by the instruction output to the human driver;

wherein the processor is further configured to, subsequent to the output device outputting the generated instruction, and in advance of the specified maneuver being performed by the human driver, determine whether the human driver has manually activated the turn signal to indicate the specified maneuver.

6. The system of claim 5, wherein, responsive to the input device receiving human driver input to cancel the turn signal, the signal transmission device sends a signal to the turn signal controller to cause the turn signal to be deactivated.

7. A computer program product for automatically activating a turn signal in a vehicle operated by a human driver, comprising:

a nontransitory computer-readable storage medium; and computer program code, encoded on the medium, configured to cause at least one processor of a navigation device operating in the vehicle operated by the human driver to perform the steps of:

receiving a destination;

determining a current location of the vehicle;

determining a route to the destination based on the current location of the vehicle;

generating an instruction for following the determined route, the instruction specifying a maneuver to be performed by the human driver at a specified location;

in advance of the vehicle reaching the specified location, causing an output device to output the generated instruction;

subsequent to causing the output device to output the generated instruction, and in advance of the specified maneuver being performed by the human driver, determining whether the human driver has manually activated the turn signal to indicate the specified maneuver; and in advance of the vehicle reaching the specified location, and in advance of the specified maneuver being performed by the human driver, and in response to a determination that the human driver of the vehicle has not manually activated the turn signal to indicate the specified maneuver, causing a signal to be automatically sent from the navigation device to a turn signal controller to cause the turn signal of the vehicle to be automatically activated, wherein the automatically activated turn signal indicates the maneuver specified by the instruction output to the human driver.

8. The computer program product of claim 7, further comprising computer program code configured to, responsive to human driver input to cancel the turn signal, cause a signal to be sent to the turn signal controller to cause the turn signal to be deactivated.

9. A system for automatically reminding a human driver to manually activate a turn signal in a vehicle operated by the human driver, comprising:

an input device, configured to receive input specifying a destination for the vehicle operated by the human driver;

a geographical position determination device, configured to determine a current location of the vehicle;

a processor, communicatively coupled to the input device and to the geographical position determination device, configured to:
determine a route to the destination based on the current location of the vehicle; and
generate an instruction for following the determined route, the instruction specifying a maneuver to be performed by the human driver at a specified location;

an output device, communicatively coupled to the processor, configured to:
output the generated instruction to the human driver in advance of the vehicle reaching the specified location; and in advance of the vehicle reaching the specified location, and in advance of the specified maneuver being performed by the human driver, and in response to a determination that the human driver of the vehicle has not manually activated the turn signal to indicate the specified maneuver, automatically output a reminder to the human driver to manually activate the turn signal;

wherein the processor is further configured to, subsequent to the output device outputting the generated instruction, and in advance of the specified maneuver being performed by the human driver, determine whether the human driver has manually activated the turn signal to indicate the specified maneuver.

10. The system of claim 9, further comprising a signal transmission device, communicatively coupled to the processor, configured to, in response to a determination that the human driver has not manually activated the turn signal after the reminder has been output, automatically send a signal to a turn signal controller to cause the turn signal of the vehicle to be automatically activated, wherein the automatically activated turn signal indicates the maneuver specified by the instruction output to the human driver.

11. A computer program product for automatically reminding a human driver to manually activate a turn signal in a vehicle operated by the human driver, comprising:
a nontransitory computer-readable storage medium; and
computer program code, encoded on the medium, configured to cause at least one processor of a navigation device operating in the vehicle operated by the human driver to perform the steps of:
receiving a destination;
determining a current location of the vehicle;
determining a route to the destination based on the current location of the vehicle;
generating an instruction for following the determined route, the instruction specifying a maneuver to be performed by the human driver at a specified location;
in advance of the vehicle reaching the specified location, causing an output device to output the generated instruction to the human driver;
subsequent to causing the output device to output the generated instruction, and in advance of the specified maneuver being performed by the human driver, determining whether the human driver has manually activated the turn signal to indicate the specified maneuver; and
in advance of the vehicle reaching the specified location, and in advance of the specified maneuver being performed by the human driver, and in response to a determination that the human driver of the vehicle has not manually activated the turn signal to indicate the specified maneuver, causing the output device to automatically output a reminder to the human driver to manually activate the turn signal.

12. The computer program product of claim 11, further comprising computer program code configured to, in response to a determination that the human driver has not manually activated the turn signal after the reminder has been output, cause the processor to automatically send a signal from the navigation device to a turn signal controller to cause the turn signal of the vehicle to be automatically activated, wherein the automatically activated turn signal indicates the maneuver specified by the instruction output to the human driver.

13. The method of claim 1, wherein:
the location specified for the maneuver comprises at least one selected from the group consisting of: an intersection; an interchange; an entrance ramp; and an exit ramp; and
the maneuver comprises at least one selected from the group consisting of: a turn; an exit; an entrance; and a lane change.

14. The method of claim 1, wherein determining the current location of the vehicle comprises determining the current location using a global positioning system.

15. The method of claim 1, wherein the navigation device comprises a built-in component of the vehicle and is communicatively coupled to the turn signal controller of the vehicle.

16. The method of claim 1, wherein the navigation device comprises a stand-alone device configured to enable transmission of a signal to the vehicle to cause the turn signal to be activated.

17. The method of claim 1, wherein the navigation device comprises a stand-alone device configured to enable transmission of a signal to the turn signal controller of the vehicle.

18. The method of claim 1, wherein automatically sending a signal from the navigation device to the turn signal controller to cause the turn signal of the vehicle to be activated comprises sending a signal by a wireless transmission medium.

19. The system of claim 5, wherein:
the location specified for the maneuver comprises at least one selected from the group consisting of: an intersection; an interchange; an entrance ramp; and an exit ramp; and
the maneuver comprises at least one selected from the group consisting of: a turn; an exit; an entrance; and a lane change.

20. The system of claim 5, wherein the geographical position determination device comprises a global positioning system (GPS) device.

21. The system of claim 5, wherein the input device, the geographical position determination device, the processor, the output device, and the signal transmission device comprise built-in components of the vehicle, and wherein the signal transmission device is communicatively coupled to the turn signal controller of the vehicle.

22. The system of claim 5, wherein the input device, the geographical position determination device, the processor, the output device, and the signal transmission device comprise components of a stand-alone navigation device configured to enable transmission of the signal to the vehicle.

23. The system of claim 5, wherein the input device, the geographical position determination device, the processor, the output device, and the signal transmission device comprise components of a stand-alone navigation device configured to enable transmission of the signal to the turn signal controller of the vehicle.

24. The system of claim 5, wherein the signal transmission device is configured to automatically send the signal from the navigation device to the turn signal controller by a wireless transmission medium.

25. The computer program product of claim 7, wherein:
the location specified for the maneuver comprises at least one selected from the group consisting of: an intersection; an interchange; an entrance ramp; and an exit ramp; and
the maneuver comprises at least one selected from the group consisting of: a turn; an exit; an entrance; and a lane change.

26. The computer program product of claim 7, wherein the computer program code configured to cause at least one processor to determine the current location of the vehicle comprises computer program code configured to cause at least one processor to determine the current location using a global positioning system.

27. The computer program product of claim 7, wherein the computer program code configured to cause a signal to be automatically sent to the turn signal controller comprises computer program code configured to cause the signal to be sent by a wireless transmission medium.

* * * * *